United States Patent [19]

Anderson et al.

[11] Patent Number: 5,354,797

[45] Date of Patent: Oct. 11, 1994

[54] COATING COMPOSITION OF HYDROXY FUNCTIONAL ACRYLIC POLYMER, POLYOL AND POLYISOCYANATE CROSSLINKING AGENT

[75] Inventors: Richard D. Anderson, Brookhaven; Douglas M. Lamb, Lansdale, both of Pa.

[73] Assignee: E. I. Du Pont de Nemours and Company, Wilmington, Del.

[21] Appl. No.: 937,815

[22] Filed: Aug. 31, 1992

[51] Int. Cl.$^5$ ................................................. C08K 5/09
[52] U.S. Cl. .................................... 524/285; 524/507; 525/123
[58] Field of Search ...................... 524/310, 285, 507; 525/123

[56] References Cited

U.S. PATENT DOCUMENTS

| | | | |
|---|---|---|---|
| 3,639,147 | 2/1972 | Benefiel et al. | 117/73 |
| 4,246,368 | 1/1981 | Murase | 525/117 |
| 4,503,175 | 3/1985 | Houze et al. | 524/39 |
| 4,609,690 | 9/1986 | Gruber | 523/334 |
| 4,710,543 | 12/1987 | Chattha et al. | 525/161 |
| 4,710,556 | 12/1987 | Plum | 526/273 |
| 4,728,543 | 3/1988 | Kurauchi et al. | 427/407.1 |
| 4,808,656 | 2/1989 | Kania et al. | 524/512 |
| 5,159,047 | 10/1992 | Simms | 528/45 |
| 5,173,530 | 12/1992 | Andreola et al. | 524/310 X |

Primary Examiner—Judy M. Reddick
Attorney, Agent, or Firm—Hilmar L. Fricke

[57] ABSTRACT

A coating composition primarily used as a clear coat of a clearcoat/color coat automotive finish; the composition has a film forming binder solids content of about 30–70% by weight contains about (A) 50–80% by weight, based on the weight of the binder, of a hydroxy functional acrylic polymer of polymerized monomers of styrene, alkyl methacrylate monomers and hydroxy alkyl methacrylate or acrylate each having 1–4 carbon atoms in the alkyl group, an ethylenic unsaturated carboxylic acid at least partically reacted with a glycidyl ester of a carboxylic acid and the polymer has a number average molecular weight of about 1,000–12,000 and (B) 1–20% by weight, based on the weight of the binder, of a polyol component and (C) 10–49% by weight, based on the weight of the binder, of an organic polyisocyanate.

15 Claims, No Drawings ized carboxylic rings of S and T; and

COATING COMPOSITION OF HYDROXY FUNCTIONAL ACRYLIC POLYMER, POLYOL AND POLYISOCYANATE CROSSLINKING AGENT

BACKGROUND OF THE INVENTION

This invention is directed to a coating composition and in particular a clear coating composition used as the clear coat of an automotive or truck clear coat/color coat finish.

Clear coat/color coat finishes for automobiles and trucks have been used in recent years and are very popular. Kurauchi et al U.S. Pat. No. 4,728,543 issued Mar. 1, 1988 and Benefiel et al U.S. Pat. No. 3,639,147 issued Feb. 1, 1972 show the application of a clear coat to a color coat or basecoat in a "wet on wet" application, i.e., the clear coat is applied before the color coat is completely cured.

There is a need for a clear coating composition that can be used to repair these clear coat/color coat finishes that has a low VOC (volatile organic content) to meet with pollution regulations and that cures rapidly at ambient temperatures or low baking temperatures in a relatively short period of time to form a finish that is tack free and that can be buffed. Also, the composition should form a smooth finish with better DOI (distinctness of image) and depth of appearance than those formed from conventional clear coaing compositions.

The novel coating composition of this invention has the aforementioned desirable characteristics.

SUMMARY OF THE INVENTION

A coating composition having a film forming binder solids content of about 30–70% by weight and an organic liquid carrier, wherein the binder contains about (A) 50–80% by weight, based on the weight of the binder, of a hydroxy functional acrylic polymer of polymerized monomers of styrene, an alkyl methacrylate having 1–4 carbon atoms in the alkyl group, hydroxy alkyl methacrylate or acrylate each having 1–4 carbon atoms in the alkyl group and an ethyleneically unsaturated carboxylic acid wherein a portion thereof has been reacted with a glycidyl ester of a carboxylic acid, preferably a mixed glycidyl ester of tertiary carboxylic acids and where the polymer has a number average molecular weight of about 1,000–12,000 determined by gel permeation chromatography;

(B) 1–20% by weight, based on the weight of the binder, of a polyol component of the formula

wherein:
$R^1$ is a covalent bond or alkylene containing 1, 2, 3 or 4 carbon atoms;
n is about 1 to about 4;
m is 2, 3 or 4; and
Q is a saturated carboxyclic ring containing 5 or 6 carbon atoms, or $S—R^2—T$ wherein S and T are each independently saturated carboxylic rings containing 5 or 6 carbon atoms, and $R^2$ is a covalent bond or an alkylene group containing 1, 2, 3 or 4 carbon atoms;
provided that no more than one $R^1$ is bound to any carbocyclic carbon atom, and further provided that when Q is $S—R^2—T$, each $R^1$ is bound to a carbon atom of the carbocyclic rings of S and T; and (C) 10–49% by weight, based on the weight of the binder, of an organic polyisocyanate.

DESCRIPTION OF THE INVENTION

In the repair of a clear coat/color coat finish of an automobile or a truck, generally the color coat is applied and dried for a short period of time but not cured and then the clear coat is applied and both are cured. If necessary the clear coat can be buffed to improve appearance and remove minor imperfections.

The coating composition of this invention is solvent based and has a binder solids content of about 30–70% by weight and preferably a binder content of at least 43% by weight for a low VOC composition. The binder contains about 50–80% by weight of the hydroxy functional acrylic polymer, 1–20% by weight of the polyol component and about 10–49% by weight of the organic polyisocyanate.

Generally, the coating composition is used as a clear coat but can be pigmented with conventional pigments and used as a monocoat or as a base coat.

The acrylic polymer used in the coating composition is prepared by conventional solution polymerization techniques in which monomers, solvents and polymerization catalyst are charged into a conventional polymerization reactor and heated to about 60°–160° C. for about 0.5–6 hours to form a polymer having number average molecular weight of about 1,000–12,000, preferably 2,000–8,000 and a weight average molecular weight of about 4,000–25,000.

Molecular weight is determined by gel permeation chromatography using polymethyl methacrylate as the standard.

Typically useful polymerization catalysts are azo type catalysts such as azo-bis-isobutyronitrile, 1,1'-azo-bis (cyanocyclohexane), acetates such as t-butyl peracetate, peroxides such as di-t-butyl peroxide, benzoates such as t-butyl perbenzoate, octoates such as t-butyl peroctoate and the like.

Typical solvents that can be used are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, ester, acetates and mixtures of any of the above.

The hydroxy functional acrylic polymer is composed of polymerized monomers of styrene, an alkyl methacrylate having 1–4 carbon atoms in the alkyl group which is either methyl methacrylate, ethyl methacrylate, propyl methacrylate, isobutyl methacrylate, n-butyl methacrylate or a mixture of these monomers, hydroxy alkyl methacrylate or acrylate that has 1–4 carbon atoms in the alkyl group such as hydroxy ethyl methacrylate, hydroxy propyl methacrylate, hydroxy butyl methacrylate, hydroxy ethyl acrylate, hydroxy propyl acrylate, hydroxy butyl acrylate and the like and an ethylenically unsaturated carboxylic acid such as acrylic acid or methacrylic acid wherein a portion of the acid, and preferably all of the acid, has been reacted with a glycidyl ester of tertiary carboxylic acid.

One preferred glycidyl ester is a mixed glycidyl ester of a synthetic tertiary carboxylic acid and has the formula

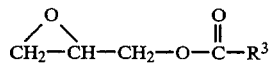

where R³ is a tertiary aliphatic hydrocarbon of 8-10 carbon atoms.

One preferred acrylic polymer contains about 10-50% by weight styrene, 5-20% by weight methyl methacrylate, 10-40% by weight of hydroxy alkyl methacrylate which preferably is a mixture of hydroxy propyl methacrylate and hydroxy ethyl methacrylate, 2-10% by weight of acrylic acid or methacrylic acid and 6-30% by weight of a mixed glycidyl ester of tertiary carboxylic acids such as Cardura ® E ester which is a glycidyl ester of a synthetic tertiary carboxylic acid having 9-11 carbon atoms.

Another preferred acrylic polymer contains styrene, methyl methacrylate, hydroxy ethyl methacrylate, acrylic acid and Cardura ® E ester.

A particularly preferred acrylic polymer contains about 44% by weight styrene, 10% by weight methyl methacrylate, 14% by weight hydroxy propyl methacrylate, 16% by weight hydroxy ethyl methacrylate, 4% by weight acrylic acid and 12% by weight Cardura ® E ester.

The polyol component comprises a caprolactone oligomer which has hydroxyl groups, and may be made by initiating caprolactone polymerization with a cyclic polyol. It is known in the art that alcohols (along with certain catalysts), including cyclic alcohols, may be used to initiate the polymerization of caprolactone according to the overall equation:

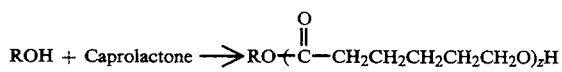

Generally the average degree of polymerization, z, will be the original molar ratio of caprolactone to ROH (or total hydroxyl groups present if ROH were a polyol), assuming the reaction was carried to completion. It is realized by those skilled in the art the product caprolactone oligomer or polymer will have a distribution of degrees of polymerization, z, and that z represents an arithmetic average of that distribution. A general reference for the polymerization of caprolactone is D. B. Johns et al., in K. J. Ivan and T. Saegusa, Ed., Elsevier Applied Science Publishers, Barking, Essex, England, 1984, p. 461-521, which is hereby incorporated by reference.

The component used in the coating composition has the formula

wherein Q, $R^1$, n and m are as defined above. Thus n, is the average degree of polymerization of each caprolactone chain corresponds to z above. It is preferred that n is from about 1 to about 2. The symbol m represents the functionality (number of hydroxyl groups) of the polyol component, and is preferably 2. $R^1$ is a covalent bond or alkylene group that connects the caprolactone chain to the group Q, Q being a carbocyclic ring or the grouping S—$R^2$—T, which also has carbocyclic rings. It is preferred that $R^1$ is a covalent bond or methylene (—$CH_2$—).

When Q is a carbocyclic ring, preferably it is cyclohexylene, more preferably 1,4-cyclohexylene. When Q is S—$R^2$—T it is preferred if $R^2$ is 2,2-propylene or methylene. It is also preferred if both S and T are each cyclohexylene, and more preferred if both S and T are 1,4-cyclohexylene. As stated above, any $R^1$ must be bound to a carbocyclic ring carbon atom (Q, S or T) and no more than one $R^1$ may be bound to any carbocyclic ring carbon atom.

One skilled in the art will understand that to obtain the polyol component wherein Q is 1,4-cyclohexylene, $R^1$ is a covalent bond, n is two and m is two, one would react one mole of 1,4-cyclohexanediol with 4 moles of caprolactone. Similarly, to obtain the polyol component where Q is 1,4-cyclohexylene, $R^1$ is methylene, n is one and m is two, one would react one mole of 1,4-cyclohexanedimethanol with two moles of caprolactone; to obtain the polyol component where Q is S—$R^2$—T and S and T are 1,4-cyclohexylene, $R^2$ is 2,2-propylene, $R^1$ is a covalent bond, n is 2.5 and m is 2, one would react one mole of 2,2-bis(4-hydroxycyclohexyl) propane with 5 moles of caprolactone.

Preferred polyol components are formed from ε-caprolactone and 1,4-cyclohexane dimethanol reacted in a molar ratio of 2/1 to 3/1.

The coating composition also contains an organic polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates also can be used such as the trimer of hexamethylene diisocyanate which is sold under the tradename Desmodur ® N-3390.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimethylol propane and is sold under the tradename "Cythane"3160.

To improve weatherability of the clear composition about 0.1-10% by weight, based on the weight of the binder, of ultraviolet light stabilizers screeners, quenchers and antioxidants can be added. Typical ultraviolet light screeners and stabilizers include the following:

Benzophenones such as hydroxy dodecycloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxy benzoyl)-triazole, substituted benzotriazoles such as hydroxy-phenyltriazole and the like.

Hindered amines such as his(1,2,2,6,6 pentamethyl-4-piperidinyl sebacate), di[4(2,2,6,6,tetramethyl piperidinyl)] sebacate and the like and any mixtures of any of the above.

The coating composition contains a sufficient amount of a catalyst to cure the composition at ambient temperatures. Generally, about 0.01–2% by weight, based on the weight of the binder, of catalyst is used. Typically useful catalysts are triethylene diamine and alkyl tin laurates such as dibutyl tin dilaurate, dibutyl tin diacetate, tertiary amines and the like. Preferred is dibutyl tin dilaurate.

Generally, flow control agents are used in the composition in amounts of about 0.1–5% by weight, based on the weight of the binder, such as polyacrylic acid, polyalkylacrylates, polyether modified dimethyl polysiloxane copolymer and polyester modified polydimethyl siloxane.

When used as a clear coating, it may be desirable to use pigments in the coating composition which have the same refractive index as the dried coating. Typically, useful pigments have a particle size of about 0.015–50 microns and are used in a pigment to binder weight ratio of about 1:100 to 10:100 and are inorganic siliceous pigments such as silica pigment having a refractive index of about 1.4–1.6.

In the application of the coating composition as a clear coating to a vehicle such as an automobile or a truck, the basecoat which may be either a solvent based composition or a waterborne composition is first applied and then dried to at least remove solvent or water before the clear coating is applied usually by conventional spraying. Electrostatic spraying also may be used. The dry film thickness of the clear coating is about 0.5–5 mils. The clear coating is dried at ambient temperatures but moderately higher temperatures up to about 40° C. can be used.

The coating composition of this invention can be used to paint or repair a variety of substrates such as previously painted metal substrates, cold roll steel, steel coated with conventional primers such as electrodeposition primers, alkyd resin repair primers and the like, plastic type substrates such as polyester reinforced fiber glass, reaction injection molded urethanes and partially crystalline polyamides.

The following examples illustrate the invention. All parts and percentages are on a weight basis unless otherwise indicated. Molecular weights are determined by gel permeation chromatography (GPC).

EXAMPLE 1

An acrylic polymer solution was prepared by charging the following constituents into a polymerization reactor equipped with a thermometer, a heating source, stirrer, thermometer, dropping funnel, nitrogen purge and a condenser:

|  | PARTS BY WEIGHT |
| --- | --- |
| Portion 1 | |
| "Solvesso" 100 (hydrocarbon solvent) | 10.0 |
| Cardura ® E Ester | 4.0 |
| Portion 2 | |
| Cardura ® E Ester | 3.3 |
| Styrene(s) monomer | 26.4 |
| Methyl methacrylate (MMA) monomer | 6.0 |
| Hydroxy propyl methacrylate (HPMA) monomer | 8.4 |
| Acrylic acid (AA) monomer | 2.3 |
| Hydroxy ethyl methacrylate (HEMA) monomer | 9.6 |
| "Solvesso" 100 | 5.0 |
| Portion 3 | |
| T-butyl peracetate solution (75% solids in mineral spirits) | 2.0 |
| Portion 4 | |
| "Solvesso" 100 | 1.0 |
| Portion 5 | |
| Butyl acetate | 20.00 |
| Total | 169.67 |

Portion 1 was added to the reactor and heated to its reflux temperature. Portions 2 and 3 were premixed and then simultaneously added to the reactor over 360 minutes while maintaining the reaction mixture at the reflux temperature. Next, Portion 4 was added over 10 minutes, and then reflux temperature was held for 90 more minutes. The mixture was cooled, and Portion 5 was then added.

The resulting acrylic polymer solution had a polymer solids content of about 60%. The polymer had a number average molecular weight of about 2232 and a weight average molecular weight of about 4681 determined by gel permeation chromatography using polystyrene as the standard. The polymer contains S/MMA/HPMA/HEMA/AA/Cardura ® E ester in a weight ratio of 44/10/14/16/4/12.

Two polyol components were prepared. A CL/CHDM (2/1) polyol component was prepared by reacting ε-caprolactone monomer and 1,4-cyclohexanedimethanol in a 2/1 molar ratio in a 3 liter round bottom flask that was fitted with a reflux condenser and stirrer. The stirrer was a stainless steel anchol driven by an air motor with gear reduction. A thermocouple was used to measure temperature of the reactants. The following were charged to the reaction flask:

|  | PARTS BY WEIGHT |
| --- | --- |
| 1,4-cyclohexanedimethanol, (Eastman Chemical Products, Inc., Kingsport, Tennessee CHDM-D Glycol) | 432.6 |
| ε-caprolactone Tone ® Monomer (EC HP, from Union Carbide Corp., Danbury, Connecticut) | 684.9 |
| 10% solution of dibutyl tin dilaurate in xylene | 1.5 |
| Total | 1119.0 |

The above components were heated to 150° C. and held at 150 to 160° C. for 4 hours. Gas chromatography showed that all the caprolactone had been consumed.

A second polyol component CL/CHDM(3/1) was prepared by reacting ε-caprolactone/1,4 cyclohexanedimethanol 3/1 in a 5 liter round bottom flask equipped as above. The following were charged to the reaction flask:

|  | PARTS BY WEIGHT |
|---|---|
| 1,4-cyclohexanedimethanol (described above) | 739.80 |
| ε-caprolactone Tone ® Monomer (described above) | 1756.85 |
| 10% solution of dibutyl tin dilaurate in xylene | 3.35 |
| Total | 2500.00 |

The above components were heated to 140° C. and held at 135 to 145° C. for 4 hours. Gas chromatography showed that all the caprolactone had been consumed.

An analysis of each polyol component by gas chromatography showed that all the caprolactone had been consumed.

A coating composition can be prepared by forming components A and B and blending these components together.

Component A

The following ingredients can be blended together to form component A:

|  | PARTS BY WEIGHT |
|---|---|
| Acrylic polymer solution (prepared above) | 52.43 |
| CL/CHDM (2/1) Polyol (prepared above) | 1.63 |
| Methyl ethyl ketone | 14.79 |
| PM acetate | 7.63 |
| Xylene | 12.23 |
| Aromatic 100 (aromatic solvent) | 4.62 |
| Ethyl acetate | 1.21 |
| Butyl acetate | 2.21 |
| Toluene | 1.59 |
| Tinuvin ® 328 (2-(2-hydroxy-3,5-ditertiary amyl phenol)-2H benzotriazole) | 0.59 |
| Tinuvin ® 292 (1,2,2,6,6-pentamethyl-4-piperidenyl)sebacate | 0.59 |
| Byk 306 (12% solids in xylene/monophenyl glycol of polyether modified dimethyl polysiloxane copolymer) | 0.47 |
| Dibutyl tin dilaurate | 0.01 |
| Total | 100.00 |

Component B

The following ingredients can be blended together to form component B which is an activator solution:

|  | PARTS BY WEIGHT |
|---|---|
| Tolonate ® HDT[1] | 71.36 |
| Ethyl acetate | 20.31 |
| PM acetate | 0.72 |
| Toluene | 7.61 |
| Total | 100.00 |

[1]Tolonate ® HDT - 1,6 hexamethylene diisocyanate adduct from Rhone-Poulenc, Inc.

Coating Composition C

Components A and B can be blended together in a 4/1 volume ratio to provide a coating composition.

The coating composition can be sprayed onto a previously coated metal substrate and dried. The resulting coating is expected to have good hardness, good appearance and acceptable flexibility.

EXAMPLE 2

Three coating compositions were prepared by forming the following components and blending these components together.

Component 1

The following ingredients were blended together to form component 1:

|  | PARTS BY WEIGHT |
|---|---|
| Acrylic polymer solution[2] | 52.43 |
| CL/CHDM (2/1) Polyol (prepared in Example 1) | 1.63 |
| Methyl ethyl ketone | 14.79 |
| PM acetate | 7.63 |
| Xylene | 12.23 |
| Aromatic 100 (aromatic solvent) | 4.62 |
| Ethyl acetate | 1.21 |
| Butyl acetate | 2.21 |
| Toluene | 1.59 |
| Tinuvin ® 328 (described in Example 1) | 0.59 |
| Tinuvin ® 292 (described in Example 1) | 0.59 |
| Byk 306 (described in Example 1) | 0.47 |
| Dibutyl tin dilaurate | 0.01 |
| Total | 100.00 |

[2]Macrynal ® SM515 from Hoechst Celanese Corp. 70% solids in butyl acetate, acrylic polymer believed to be 10-50% styrene, 5-20% methyl methacrylate, 10-40% hydroxy ethyl methacrylate, 2-10% acrylic acid and 6-30% Cardura ® E ester Component 2

The following ingredients were blended together to form component B2 which is an activator solution:

|  | PARTS BY WEIGHT |
|---|---|
| Tolonate ® HDT (described in Example 1) | 71.36 |
| Ethyl acetate | 20.31 |
| PM acetate | 0.72 |
| Toluene | 7.61 |
| Total | 100.00 |

Component 3

The following ingredients were blended together to form component 3.

|  | PARTS BY WEIGHT |
|---|---|
| Acrylic polymer solution (described above) | 51.86 |
| CL/CHDM (3/1) Polyol (prepared in Example 1) | 2.06 |
| Methyl ethyl ketone | 14.61 |
| PM acetate | 7.54 |
| Xylene | 12.44 |
| Aromatic 100 (aromatic solvent) | 4.57 |
| Ethyl acetate | 1.19 |
| Butyl acetate | 2.53 |
| Toluene | 1.57 |
| Tinuvin ® 328 (desdribed in Example 1) | 0.58 |
| Tinuvin ® 292 (described in Example 1) | 0.58 |
| Byk 306 (described in Example 1) | 0.46 |
| Dibutyl tin dilaurate | 0.01 |
| Total | 100.00 |

Component 4

Component 4 was prepared which is identical to component 1, except the polyol component was omitted and acrylic polymer substituted therefor.

Three coating compositions were formulated as follows:

Coating Composition No. 1

Components 1 and 2 were blended together in a 4/1 volume ratio to provide a coating composition with a 46.5% binder solids content and a ratio of acrylic polymer/polyol/isocyanate of 63.5/2.7/33.8 and has an NCO/OH (isocyanate group/hydroxyl group) molar ratio of 1.

Coating Composition No. 2

Components 3 and 2 were blended together in a 4/1 volume ratio to provide a coating composition with a 46.5% binder solids content and a ratio of acrylic polymer/polyol/isocyanate of 62.3/3.5/34.2 and has an NCO/OH ratio of 1.

Coating Composition No. 3

Components 4 and 2 were blended together in a 4/1 volume ratio to provide a coating composition with a 46.5% binder solids content and a ratio of acrylic polymer/isocyanate of 65.2/34.8 and has an NCO/OH ratio of 1.

Each of the coating compositions 1-3 were sprayed onto separate previously coated metal substrates and dried. The following is a comparison of the important properties of the compositions:

| PROPERTY | Coating Composition No. 1 2.7% 2/1 Polyol | Coating Composition No. 2 3.5% 3/1 Polyol | Coating Composition No. 3 No Polyol |
|---|---|---|---|
| Tukon Hardness (Knoops) | | | |
| 1 Day | 1.8 | 1.6 | 2.1 |
| 7 Day | 9.3 | 10.0 | 9.2 |
| B.K. Drying Recorder (final dry in hours) | 7 | 8 | 7 |
| Swelling Ratio In Methylene Chloride | | | |
| 1 Day | 2.13 | 2.08 | 1.97 |
| 7 Day | 1.60 | 1.56 | 1.47 |
| Flexibility | excellent | excellent | very good |

In a field test automobiles coated with a solvent borne basecoat were sprayed with compositions 1-3 and dried under ambient conditions. The following appearance ratings were visually determined.

| Appearance Rating | | | |
|---|---|---|---|
| Horizontal Surface | 7.5 | 8.0 | 7.0 |
| Vertical Surface | 7.0 | 7.5 | 6.5 |
| (0-10, with 10 best) | | | |

The above data shows that the presence of polyol gives a noticeable improvement in appearance (as determined visually as smoothness and depth of appearance) on both horizontal and vertical surfaces. Other basic properties of the clearcoat (hardness, cure as determined by swelling ratio in methylene chloride, dry time, and flexibility) are maintained at desired levels when using the polyol.

We claim:

1. A clear coating composition having a film forming binder solids content of about 30-70% by weight and organic solvent, wherein the binder contains
   - (A) 50-80% by weight, based on the weight of the binder, of a hydroxy functional acrylic polymer consisting essentially of polymerized monomers of styrene, an alkyl methacrylate having 1-4 carbon atoms in the alkyl group, a hydroxy alkyl methacrylate or hydroxy alkyl acrylate each having 1-4 carbon atoms in the alkyl group, an ethylenically unsaturated carboxylic acid reacted with a glycidyl ester of carboxylic acid; wherein the acrylic polymer has a number average molecular weight of about 1,000-12,000 determined by gel permeation chromatography;
   - (B) 1-20% by weight, based on the weight of the binder, of a polyol component having the formula of

wherein:
   $R^1$ is a covalent bond or alkylene group containing 1, 2, 3 or 4 carbon atoms;
   n is 1 to 4;
   m is 2, 3 or 4; and
   Q is a saturated carbocyclic ring containing 5 or 6 carbon atoms, or S—$R^2$—T wherein S and T are each independently saturated carbocyclic rings containing 5 or 6 carbon atoms, and $R^2$ is a covalent bond or an alkylene group containing 1, 2 or 3 carbon atoms;
   provided that no more than one $R^1$ is bound to any carbocyclic carbon atom, and further provided that when Q is S—$R^2$—T, each $R^1$ is bound to a carbon atom of the carbocyclic rings of S and T and
   - (C) 10-49% by weight, based on the weight of the binder, of an organic polyisocyanate.

2. The coating composition of claim 1 in which the glycidyl ester of carboxylic acid has the formula

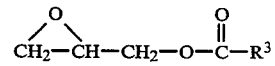

where $R^3$ is a tertiary aliphatic hydrocarbon of 8-10 carbon atoms.

3. The coating composition of claim 2 in which the acrylic polymer consists essentially of about 10-50% by weight styrene, 5-20% by weight of methyl methacrylate, 10-40% by weight of hydroxy alkyl methacrylate, 2-10% weight of acrylic acid or methacrylic acid that has been reacted with the glycidyl ester.

4. The coating composition of claim 3 in which the acrylic polymer consists essentially of styrene, methyl methacrylate, hydroxy ethyl methacrylate, acrylic acid and glycidyl ester.

5. The coating composition of claim 1 wherein Q is a saturated carbocyclic ring containing 5 or 6 carbon atoms.

6. The coating composition of claim 5 wherein Q is cyclohexylene.

7. The coating composition of claim 5 wherein Q is 1,4-cyclohexylene.

8. The coating composition of claim 1 wherein $R^1$ is a covalent bond or methylene.

9. The coating composition of claim 7 wherein $R^1$ is a covalent bond or methylene.

10. The coating composition of claim 1 wherein n is 1 to 2 and m is 2.

11. The coating composition of claim 1 in which the organic polyisocyanate is an aliphatic or cycloaliphatic polyisocyanate.

12. The coating composition of claim 11 in which the organic polyisocyanate is a trimer of hexamethylene diisocyanate.

13. The coating composition of claim 1 in which the composition contains about 0.01–2% by weight of the binder, of catalyst of triethylene diamine, an alkyl tin laurate or a mixture thereof.

14. The coating composition of claim 1 in which the composition contains about 0.1–10% by weight of ultraviolet light absorbers and antioxidants.

15. A substrate coated with a dried and cured layer of the composition of claim 1.

* * * * *